United States Patent
Kim

(10) Patent No.: US 10,824,283 B2
(45) Date of Patent: Nov. 3, 2020

(54) FINGERPRINT RECOGNIZABLE TOUCH SCREEN APPARATUS AND METHOD OF OPERATING THE SAME

(71) Applicant: SAMSUNG ELECTRONICS CO., LTD., Suwon-si (KR)

(72) Inventor: Dongkyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 216 days.

(21) Appl. No.: 15/856,940

(22) Filed: Dec. 28, 2017

(65) Prior Publication Data

US 2019/0042018 A1 Feb. 7, 2019

(30) Foreign Application Priority Data

Aug. 4, 2017 (KR) ........................ 10-2017-0099075

(51) Int. Cl.
*G06F 3/044* (2006.01)
*G06F 3/041* (2006.01)
*G06K 9/00* (2006.01)
*G06K 9/20* (2006.01)
*G06K 9/22* (2006.01)

(52) U.S. Cl.
CPC ............ *G06F 3/044* (2013.01); *G06F 3/0412* (2013.01); *G06K 9/0002* (2013.01); *G06K 9/00087* (2013.01); *G06K 9/209* (2013.01); *G06F 2203/04107* (2013.01); *G06F 2203/04112* (2013.01); *G06K 9/22* (2013.01)

(58) Field of Classification Search
None
See application file for complete search history.

(56) References Cited

U.S. PATENT DOCUMENTS

| | | | |
|---|---|---|---|
| 9,411,474 B2 | 8/2016 | Rauhala et al. | |
| 9,606,686 B2 | 3/2017 | Reynolds et al. | |
| 2016/0350570 A1* | 12/2016 | Han | G06F 3/0416 |
| 2018/0113558 A1* | 4/2018 | Cho | G06K 9/0002 |
| 2018/0137333 A1 | 5/2018 | Kim et al. | |
| 2018/0218191 A1* | 8/2018 | Berget | G06F 3/0416 |
| 2018/0335880 A1* | 11/2018 | Seol | G06F 3/0488 |

FOREIGN PATENT DOCUMENTS

KR 10-1719975 B1 3/2017
KR 10-2018-0054069 A 5/2018

* cited by examiner

*Primary Examiner* — Krishna P Neupane
(74) *Attorney, Agent, or Firm* — Sughrue Mion, PLLC

(57) ABSTRACT

A fingerprint recognizable touch screen apparatus, an operating method thereof, and an electronic apparatus including the touch screen apparatus are provided. The fingerprint recognizable touch screen apparatus may include a touch sensor for sensing a touch of a user and a fingerprint sensor for recognizing a fingerprint of the user. The fingerprint sensor may include a fingerprint sensing region, a trace region extending from the fingerprint sensing region, and at least one shield-touch sensing multiple-use region provided in the trace region. The shield-touch sensing multiple-use region may be configured to serve as an electric shield in a fingerprint recognition mode and as a touch sensing region in a touch sense mode. The fingerprint sensor may further include at least one shield region provided in the trace region.

21 Claims, 14 Drawing Sheets

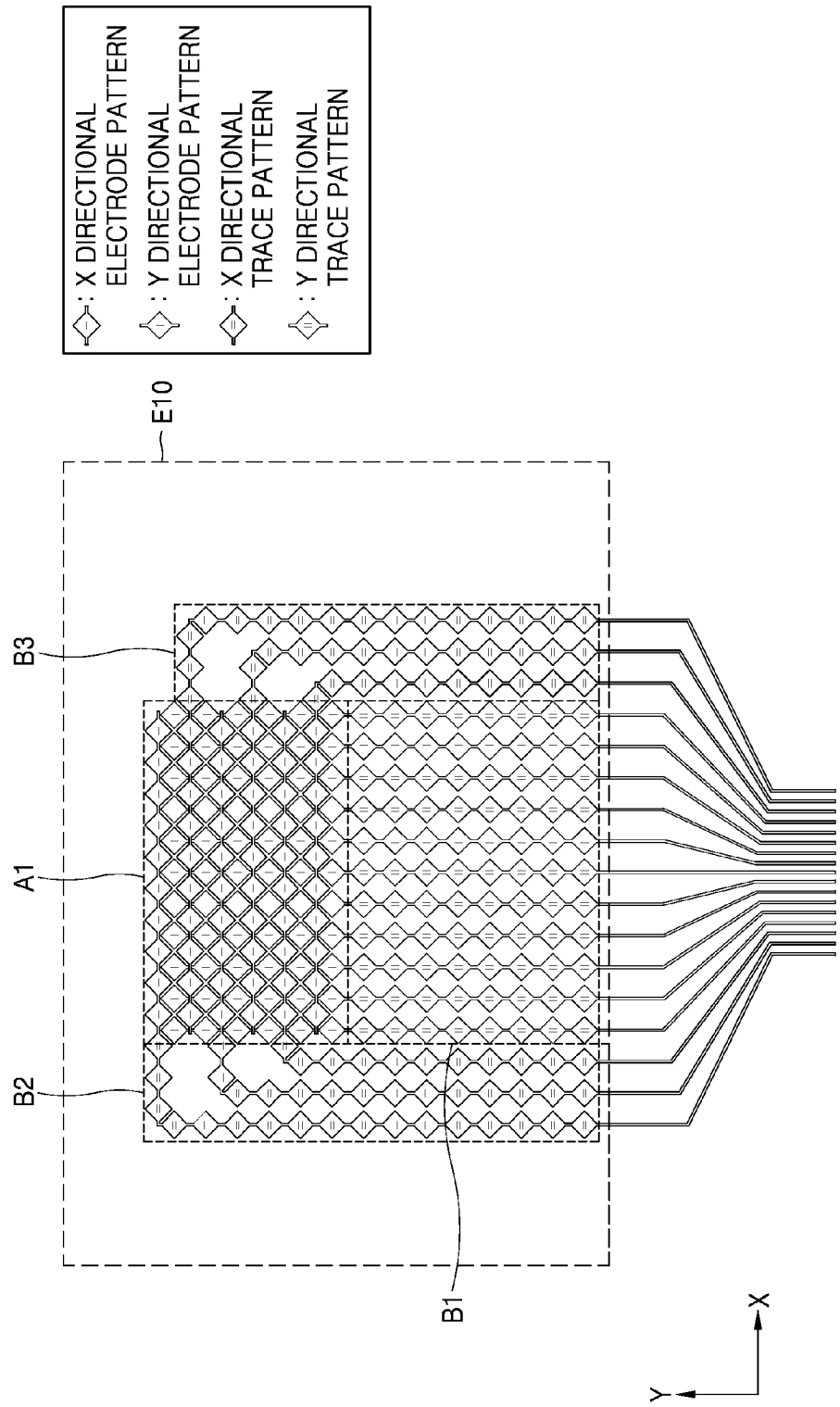

FINGERPRINT RECOGNIZABLE TOUCH SCREEN APPARATUS AND METHOD OF OPERATING THE SAME

CROSS-REFERENCE TO RELATED APPLICATION

This application claims priority from Korean Patent Application No. 10-2017-0099075, filed on Aug. 4, 2017 in the Korean Intellectual Property Office, the disclosure of which is incorporated herein in its entirety by reference.

BACKGROUND

1. Field

Apparatuses and methods consistent with exemplary embodiments relate to a touch screen apparatus having a fingerprint recognition function and an operating method thereof, and an electronic apparatus including a touch screen apparatus.

2. Description of the Related Art

A touch screen is an input device that, when a user touches or presses a screen with a finger or the like, recognizes a touch position or related information and transmits the information to a system. A touch screen is simple and easy to use. In particular, a capacitive touch screen has advantages of high transmittance, excellent durability, superior touch resolution, and multi-touch capability. A touch screen panel may be used in not only mobile devices, such as smart phones and tablet PCs, but also in a wide variety of electronic devices such as automatic teller machines (ATMs), automatic ticket issuing machines, and navigation devices.

In recent years, the need for personal authentication of any of various mobile devices and electronic devices has been gradually expanded. Personal authentication functions using personal features such as a fingerprint, voice, face, and iris can be used in mobile devices, access control devices, financial devices, and the like. Fingerprint recognition technologies for smart phones and tablet PCs according to methods of the related art constitute a fingerprint recognition module separately from the touch screen module.

SUMMARY

One or more exemplary embodiments may provide touch screen apparatuses having a fingerprint recognition function.

One or more exemplary embodiments may provide touch screen apparatuses having superior fingerprint recognition and touch sensing performances.

One or more exemplary embodiments may provide methods of operating the touch screen apparatuses.

One or more exemplary embodiments may provide electronic apparatuses including the touch screen apparatuses.

Additional exemplary aspects will be set forth in part in the description which follows and, in part, will be apparent from the description, or may be learned by practice of the presented exemplary embodiments.

According to an aspect of an exemplary embodiment, a fingerprint recognizable touch screen apparatus including: a touch sensor sensing a touch of a user; and a fingerprint sensor recognizing a fingerprint of the user, wherein the fingerprint sensor may include: a fingerprint sensing region; a trace region extending from the fingerprint sensing region; and at least one shield region and at least one shield-touch sensing multiple-use region provided in the trace region.

The shield-touch sensing multiple-use region may be configured to be grounded or to receive a constant voltage applied thereto in a fingerprint recognition mode, and to be connected to a touch sensing circuit portion in a touch sense mode.

The at least one shield region may be configured to be grounded or to receive a constant voltage applied thereto.

The at least one shield-touch sensing multiple-use region may include a first multiple-use region spaced apart from the fingerprint sensing region, and the at least one shield region may include a first shield region arranged between the fingerprint sensing region and the first multiple-use region.

The at least one shield region may further include a second shield region spaced apart from the first shield region, and the first multiple-use region is arranged between the first shield region and the second shield region.

The fingerprint sensing region may be spaced apart from an end portion the touch screen apparatus at a certain interval, and the at least one shield region and the at least one shield-touch sensing multiple-use region may be alternately arranged between the fingerprint sensing region and the end portion of the touch screen apparatus.

The fingerprint sensing region may include: a plurality of first electrodes extending in a first direction; a plurality of second electrodes extending in a second direction, different from the first direction; and an insulating layer provided between the plurality of first electrodes and the plurality of second electrodes, and the trace region may include a first trace region extending from the plurality of first electrodes and a second trace region extending from the plurality of second electrodes.

The at least one shield region and the at least one shield-touch sensing multiple-use region may be provided in the first trace region.

The at least one shield region may be provided in each of the first trace region and the second trace region, and the at least one shield-touch sensing multiple-use region may be provided in the first trace region.

The at least one shield region may include a shield region configured to shield a first trace provided in the first trace region and a shield region configured to shield a second trace provided in the second trace region, and the shield region configured to shield the first trace and the shield region configured to shield the second trace may be electrically connected to each other.

The second trace region may include a first secondary trace region extending to a first side of the fingerprint sensing region and a second secondary trace region extending to a second side of the fingerprint sensing region.

The fingerprint sensing region may include a plurality of first electrodes extending in a first direction and a plurality of second electrodes extending in a second direction, different from the first direction, and at least one of the plurality of first electrodes and the plurality of second electrodes may include a plurality of diamond type pattern units and a connector connecting the plurality of diamond type pattern units.

The plurality of first electrodes and the plurality of second electrode may each include a plurality of diamond type pattern units and a connector connecting the plurality of diamond type pattern units, or the plurality of first electrodes may include a plurality of electrodes lines, and the plurality of second electrodes include a plurality of diamond type pattern units and a connector connecting the plurality of diamond type pattern units.

The trace region may include a plurality of diamond type pattern units and a connector connecting the plurality of diamond type pattern units, or may include a plurality of line pattern units.

At least one of the shield region and the shield-touch sensing multiple-use region may include a plurality of diamond type pattern units and a connector connecting the plurality of diamond type pattern units.

The fingerprint recognizable touch screen apparatus may further include a dummy pattern provided around and outside the fingerprint sensing region and the trace region.

The fingerprint sensing region may include a plurality of electrodes configured to operate as touch sense electrodes in a touch sense mode.

The fingerprint recognizable touch screen apparatus may be configured to sense a touch of the user based on a touch signal received from the fingerprint sensing region, a touch signal received from the multiple-use region, and a touch signal received from the touch sensor in the touch sense mode.

The touch sensor and the fingerprint sensor may face each other with a separation film interposed therebetween, and a partial region of the touch sensor corresponding to the fingerprint sensing region and the trace region may be an inactive region.

The touch sensor may include: a plurality of third electrodes extending in a first direction; a plurality of fourth electrodes extending in a second direction, different from the first direction; and an insulating layer provided between the plurality of third electrodes and the plurality of fourth electrodes.

According to an aspect of another exemplary embodiment, a fingerprint recognizable touch screen apparatus may include: a touch sensor sensing a touch of a user; and a fingerprint sensor recognizing a fingerprint of the user, wherein the fingerprint sensor may include: a fingerprint sensing region; a trace region extending from the fingerprint sensing region; and at least one shield-touch sensing multiple-use region provided in the trace region, wherein the shield-touch sensing multiple-use region is configured to electrically shield the trace region in a fingerprint recognition mode and to sense a touch of the user in a touch sense mode.

The trace region may include a first trace region extending from a first end portion of the fingerprint sensing region and a second trace region extending from a second end portion of the fingerprint sensing region, the first trace region may be arranged between the first end portion of the fingerprint sensing region and an end portion of the touch screen apparatus, and the shield-touch sensing multiple-use region may be provided in the first trace region.

The fingerprint recognizable touch screen apparatus may further include at least one first shield region provided in the first trace region separate from the multiple-use region.

The fingerprint recognizable touch screen apparatus may further include: at least one first shield region provided in the first trace region separate from the multiple-use region, and at least one second shield region provided in the second trace region.

According to an aspect of another exemplary embodiment, an electronic apparatus include the above-defined fingerprint recognizable touch screen apparatus defined.

BRIEF DESCRIPTION OF THE DRAWINGS

These and/or other exemplary aspects and advantages will become apparent and more readily appreciated from the following description of the exemplary embodiments, taken in conjunction with the accompanying drawings in which:

FIG. 10 is a plan view of a configuration of a fingerprint sensor according to a comparative example;

DETAILED DESCRIPTION

Figure 1:
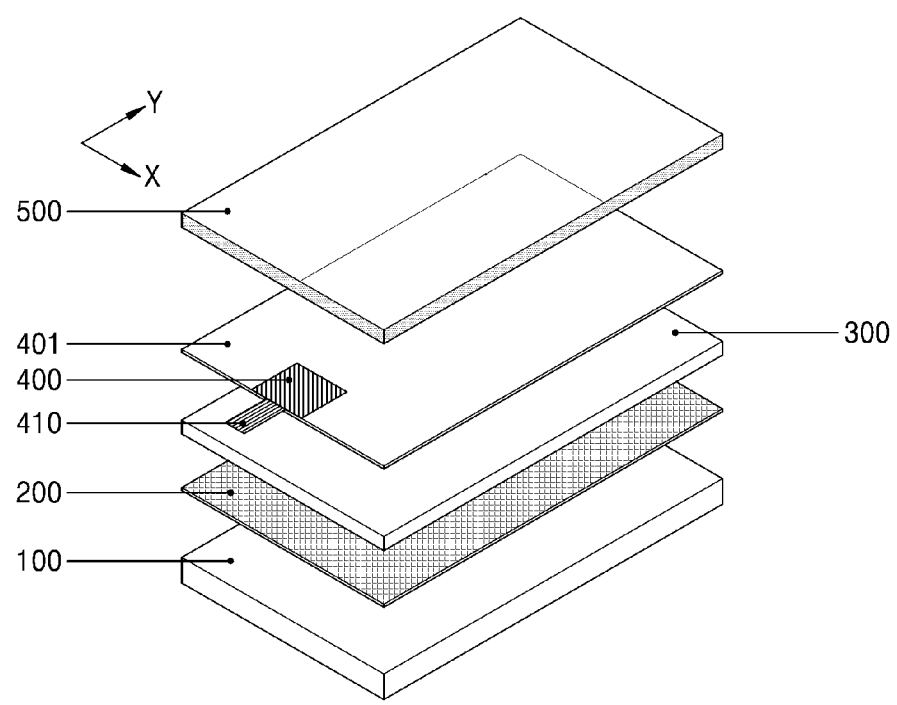
FIG. 1 is an exploded perspective view of a fingerprint recognizable touch screen apparatus according to an exemplary embodiment.

Any of various exemplary embodiments will now be described more fully with reference to the accompanying drawings in which exemplary embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe any of various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, a touch screen apparatus having a fingerprint recognition function, an operating method thereof, and an electronic apparatus including the touch screen apparatus according to exemplary embodiments are described in detail with reference to the accompanying drawings. In the drawings, widths and thicknesses of layers or regions may be exaggerated to a degree for clarity of the specification and for convenience of description. Throughout the detailed description section of the present inventive concept, like reference numerals denote like constituent elements.

FIG. 1 is an exploded perspective view of a fingerprint recognizable touch screen apparatus according to an exemplary embodiment.

Referring to FIG. 1, a touch screen apparatus may include a touch sensor 200 for sensing a touch by a user and a fingerprint sensor 400 for recognizing a fingerprint of a user. The touch sensor 200 and the fingerprint sensor 400 may be arranged on and above a display panel 100. The display panel 100 may be, for example, a liquid crystal display (LCD) panel, but the present disclosure is not limited thereto and any of various types of display panels may be employed therefor. For example, the display panel 100 may be an organic light emitting diode (OLED) panel. The touch sensor 200 may be provided on the display panel 100, a transparent separation film 300 may be provided on the touch sensor 200, and the fingerprint sensor 400 may be provided on the transparent separation film 300. The fingerprint sensor 400 may be provided on a sub-substrate 401. A combination of the sub-substrate 401 and the fingerprint sensor 400 formed thereon may be considered to be a fingerprint sensor. A transparent film 500 may be provided to cover the fingerprint sensor 400. The transparent separation film 300 and the transparent film 500 may be formed of a transparent insulating material such as a glass film.

Though not illustrated in FIG. 1, the fingerprint sensor 400 may include a plurality of first electrodes extending in a first direction, for example, a Y-axis direction (or, an X-axis direction) and a plurality of second electrodes extending in a second direction, for example, the X-axis direction (or, the Y-axis direction) crossing the first electrodes, and may further include an insulating layer between the first electrodes and the second electrodes. A mutual capacitance may be formed between the first electrodes and the second electrodes. Electrode patterns, that is, the first electrodes and second electrodes, of the fingerprint sensor 400 may be arranged at intervals of several tens of micrometers, for example, about 30 µm to 90 µm or about 50 µm to 70 µm. A connector 410 extending from the fingerprint sensor 400 may include a plurality of wires. The connector 410 may be connected to a sensing circuit (not shown).

Though not illustrated in FIG. 1, the touch sensor 200 may also include a plurality of third electrodes extending in the first direction, for example, the Y-axis direction (or, the X-axis direction) and a plurality of fourth electrodes extending in the second direction, for example, the X-axis direction (or, the Y-axis direction) crossing the third electrodes, and may further include an insulating layer between the third electrodes and the fourth electrodes. The electrodes of the touch sensor 200 may cover the entire area of a touch screen, or may cover a large majority of the area of the touch screen. Electrode patterns, that is, the third electrodes and the fourth electrodes, of the touch sensor 200 may be arranged at intervals of, for example, about 2 mm to 5 mm or about 3 mm to 4 mm. A mutual capacitance may be formed between the third electrodes and the fourth electrodes. Accordingly, the touch sensor 200 may be a capacitive touch sensor.

As the touch sensor 200 and the fingerprint sensor 400 both are provided on a screen of the display panel 100, both touch sense and fingerprint recognition may be performed on a single screen. When a touch screen module and a fingerprint recognition module are separately provided, two separate modules are needed, but in the present exemplary embodiment since touch sense and fingerprint recognition are performed on a single screen, the overall configuration of the apparatus may be simplified. Although FIG. 1 illustrates a case in which the touch sensor 200 and the fingerprint sensor 400 are provided as separate layers with respect to the transparent separation film 300, the touch sensor 200 and the fingerprint sensor 400 may be formed on a same layer. In other words, an electrode pattern for touch sense and an electrode pattern for fingerprint recognition may be formed on a single substrate (sub-substrate).

Figure 2:
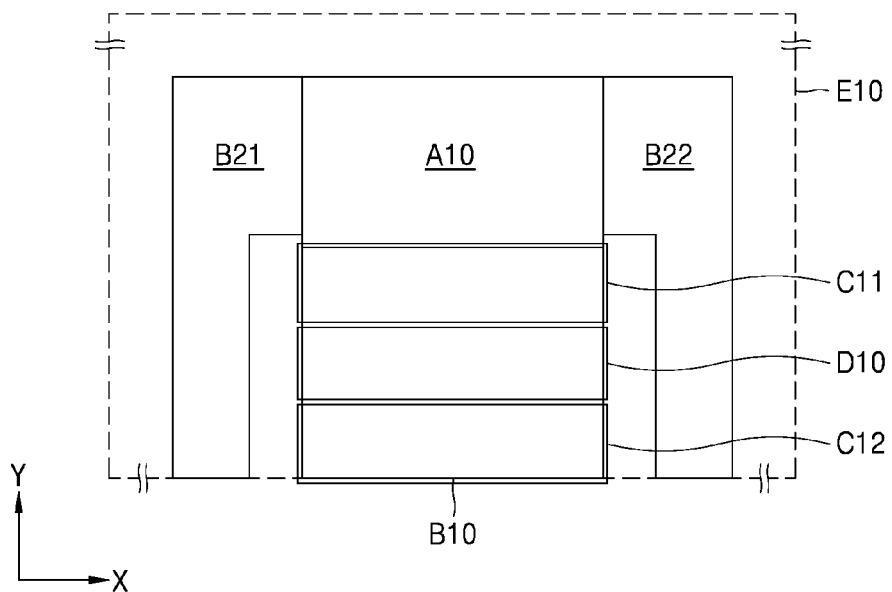
FIG. 2 is a plan view of a configuration of a fingerprint sensor applicable to a touch screen apparatus, according to an exemplary embodiment.

FIG. 2 is a plan view of a configuration of a fingerprint sensor applicable to a touch screen apparatus, according to an exemplary embodiment.

Referring to FIG. 2, the fingerprint sensor may include a fingerprint sensing region A10 and trace regions B10, B21, and B22 adjacent to the fingerprint sensing region A10. The trace regions B10, B21, and B22 may include the first trace region B10 including a plurality of traces extending from first electrode patterns of the fingerprint sensing region A10 and the secondary trace regions B21 and B22 including a plurality of traces extending from second electrode patterns of the fingerprint sensing region A10. The secondary trace regions B21 and B22 may include the first secondary trace region B21 and the second secondary trace region B22 disposed sides of the fingerprint sensing region A10. In some cases, only one of the first secondary trace regions B21 and second secondary trace B22 may be provided. The trace regions B10, B21, and B22 may comprise a wire portion or an extension portion of wires.

The fingerprint sensor of the present exemplary embodiment may include at least one shield region C11 and C12, provided in one or more of the trace regions B10, B21, and B22, and at least one multiple-use region D10 for shield-touch sensing.

The shield regions C11 and C12 may reduce or prevent noise generated by a human finger touching the first trace region B10 when a fingerprint is recognized in the fingerprint sensing region A10. When a finger touches the first trace region B10, a capacitance value is changed accordingly so that it may be difficult to obtain fingerprint information having a high signal-to-noise ratio (SNR). The shield regions C11 and C12 may reduce or prevent the above problem, and thus fingerprint recognition performance may be increased. The shield regions C11 and C12 may be grounded or a constant voltage may be applied thereto. The shield regions C11 and C12 may be shield-only regions.

The shield-touch sensing multiple-use region D10 may be configured to work as a shield, that is, an electric shield, in a fingerprint recognition mode, and as a touch sensing region in a touch sense mode. To this end, the multiple-use region D10 may be grounded or a constant voltage may be applied thereto in the fingerprint recognition mode. The multiple-use region D10 may be connected to a touch sensing circuit portion in the touch sense mode. When the multiple-use region D10 is not included, it may be difficult to perform touch sensing in the first trace region B10, and thus the overall touch sense performance may deteriorate. By using the multiple-use region D10, noise or malfunction may be reduced when fingerprint recognition is performed, and for touch sensing, the multiple-use region D10 may be used as a touch sense region so that touch performance may be improved.

The multiple-use region D10 may be arranged in accordance with touch patterns (electrodes) of the touch sensor 200 of FIG. 1. The multiple-use region D10 may be spaced apart from the fingerprint sensing region A10, and the shield regions C11 and C12 may include the first shield region C11 arranged between the fingerprint sensing region A10 and the multiple-use region D10. Furthermore, the shield regions C11 and C12 may further include the second shield region C12 space apart from the first shield region C11. The multiple-use region D10 may be arranged between the first shield region C11 and the second shield region C12. The fingerprint sensing region A10 may be arranged inside spaced apart from an end portion of the touch screen apparatus by a certain distance. At least one of the shield regions C11 and C12 and at least one multiple-use region D10 may be alternately arranged between the fingerprint sensing region A10 and the end portion of the touch screen apparatus. A reference numeral E10 denotes a display region E10.

Figure 3:
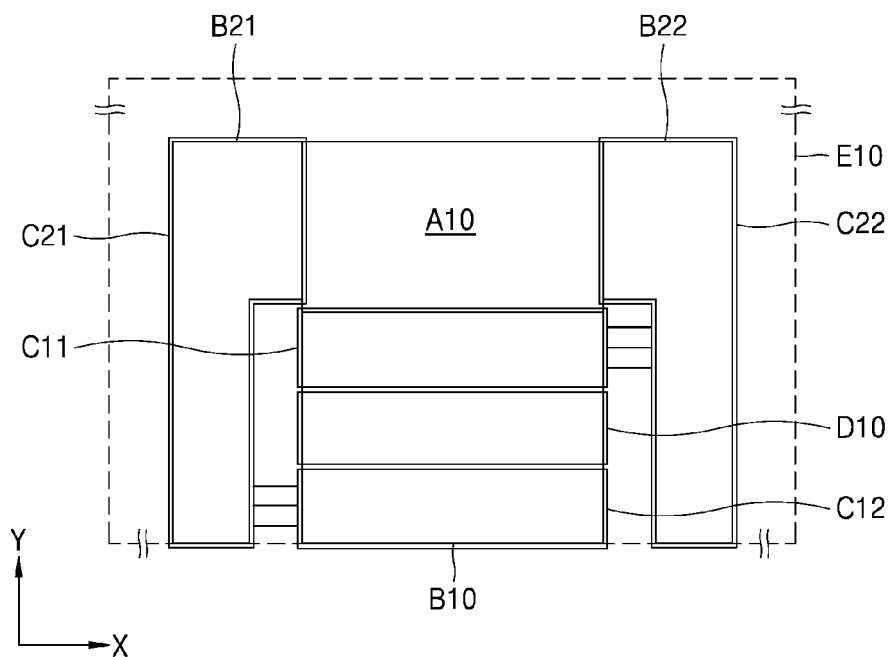
FIG. 3 is a plan view of a configuration of a fingerprint sensor applicable to a touch screen apparatus, according to another exemplary embodiment.

FIG. 3 is a plan view of a configuration of a fingerprint sensor applicable to a touch screen apparatus, according to another exemplary embodiment.

Referring to FIG. 3, shield regions C21 and C22 may be provided in the secondary trace regions B21 and B22. A third shield region C21 may be arranged in the first secondary trace region B21, and a fourth shield region C22 may be arranged in the second secondary trace region B22. In this case, the third shield region C21 may be electrically connected to any one of the first shield region C11 and the second shield region C12, and the fourth shield region C22 may be electrically connected to the other of the first shield region C11 and the second shield region C12. Lines connecting the third shield region C21 and the second shield region C12 denote that they are electrically connected to each other. Similarly, lines connecting the fourth shield region C22 and the first shield region C11 denote that they are electrically connected to each other. Since the shield regions C21 and C22 are provided in the second trace regions B21 and B22, noise that may be generated in the second trace regions B21 and B22 may be prevented.

Figure 4:
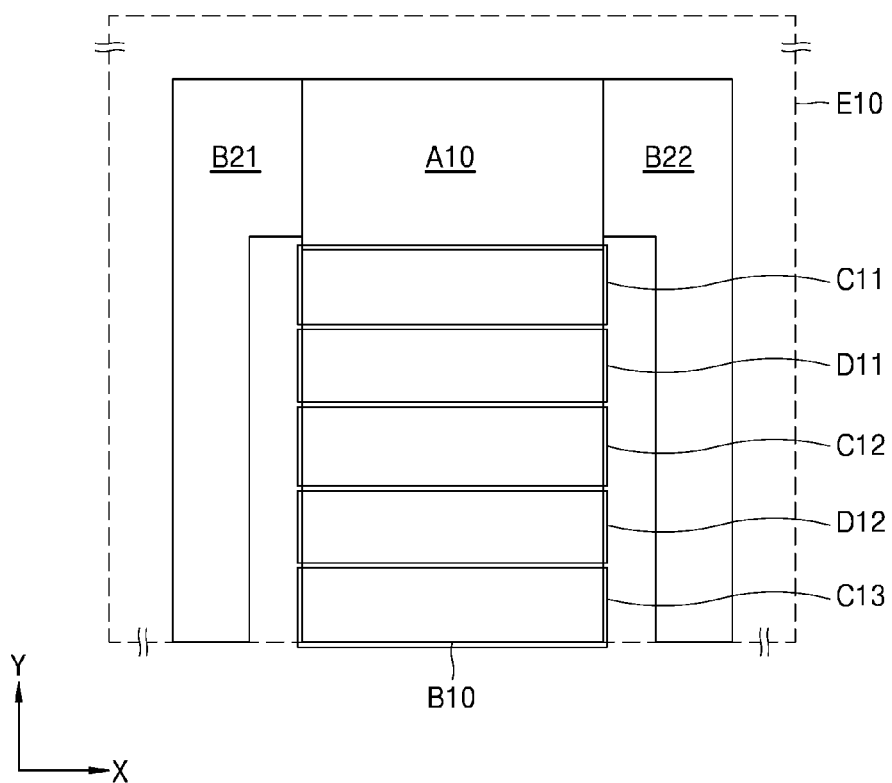
FIG. 4 is a plan view of a configuration of a fingerprint sensor applicable to a touch screen apparatus, according to another exemplary embodiment.

FIG. 4 is a plan view of a configuration of a fingerprint sensor applicable to a touch screen apparatus, according to another exemplary embodiment.

Referring to FIG. 4, a plurality of shield regions C11, C12, and C13 and a plurality of multiple-use regions D11 and D12 may be alternately arranged under the fingerprint sensing region A10. The number and size of the shield regions and the multiple-use regions may vary according to the location of the fingerprint sensing region A10 in the display panel 100. Four or more shield regions and three or more multiple-use regions may be used.

Figure 5:
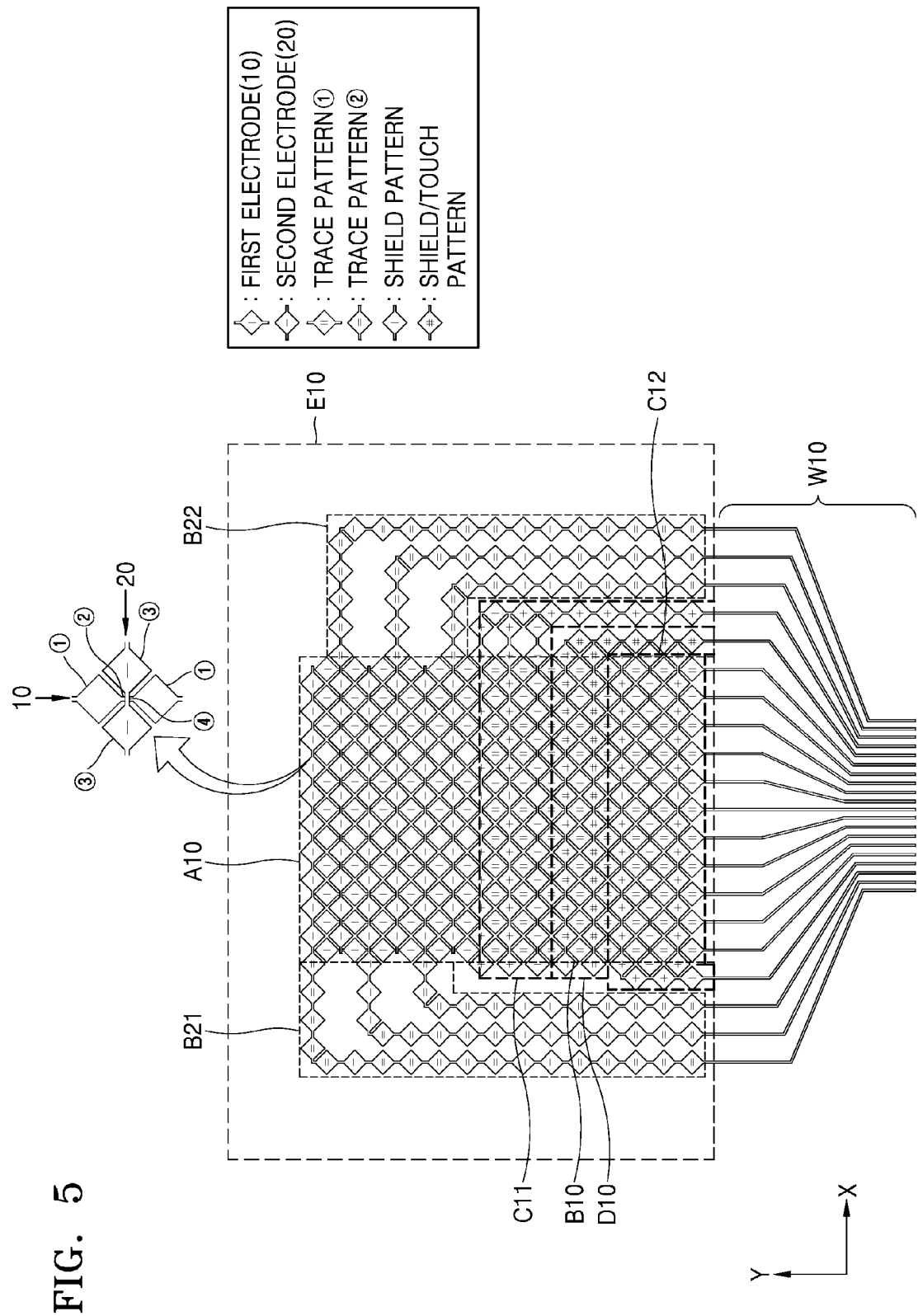
FIG. 5 is a plan view of a detailed configuration of a fingerprint sensor applicable to a touch screen apparatus, according to an exemplary embodiment.

FIG. 5 is a plan view of a detailed configuration of a fingerprint sensor applicable to a touch screen apparatus, according to an exemplary embodiment.

Referring to FIG. 5, a fingerprint sensing region A10 may include a plurality of first electrodes 10 extending in a first direction, for example, a Y-axis direction, and a plurality of second electrodes 20 extending in a second direction, for example, an X-axis direction. Capacitance may be formed between the first electrodes 10 and the second electrodes 20.

The first electrodes 10 may include a plurality of diamond type pattern units 1 and a connector 2 therebetween. Similarly, the second electrodes 20 may include a plurality of diamond type pattern units 3 and a connector 4 therebetween. The shapes of the first and second electrodes 10 and 20 are exemplary and may be changed in any of various ways. At least any one of the first and second electrodes 10 and 20 may include a polygonal pattern that is not a diamond type. Furthermore, at least any one of the first and second electrodes 10 and 20 may be a line pattern. The first and second electrodes 10 and 20 may be formed of, for example, transparent conductive oxide (TCO) such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO).

A first trace region B10 may be provided, and the first trace region B10 may include a plurality of electrode patterns extending from the first electrodes 10 of the fingerprint sensing region A10. Secondary trace regions B21 and B22 may be provided, and the secondary trace regions B21 and B22 may include a plurality of electrode patterns extending from the second electrodes 20.

At least one shield region C11 and C12 and at least one shield-touch sensing multiple-use region D10 may be provided on the first trace region B10. The multiple-use region D10 may be arranged between the first shield region C11 and the second shield region C12. The first and second shield regions C11 and C12 may include an electrode pattern that is the same as or similar to the second electrodes 20. The multiple-use region D10 may also include an electrode pattern that is the same as or similar to the second electrodes 20.

A plurality of wires W10 extending from the respective electrode patterns of the first trace region B10, the first secondary trace region B21, the second secondary trace region B22, the first shield region C11, the second shield region C12, and the multiple-use region D10 may protrude from the outside of the display region E10. The wires W10 may be connected to each terminal of a circuit portion (sensing circuit portion).

Figure 6:
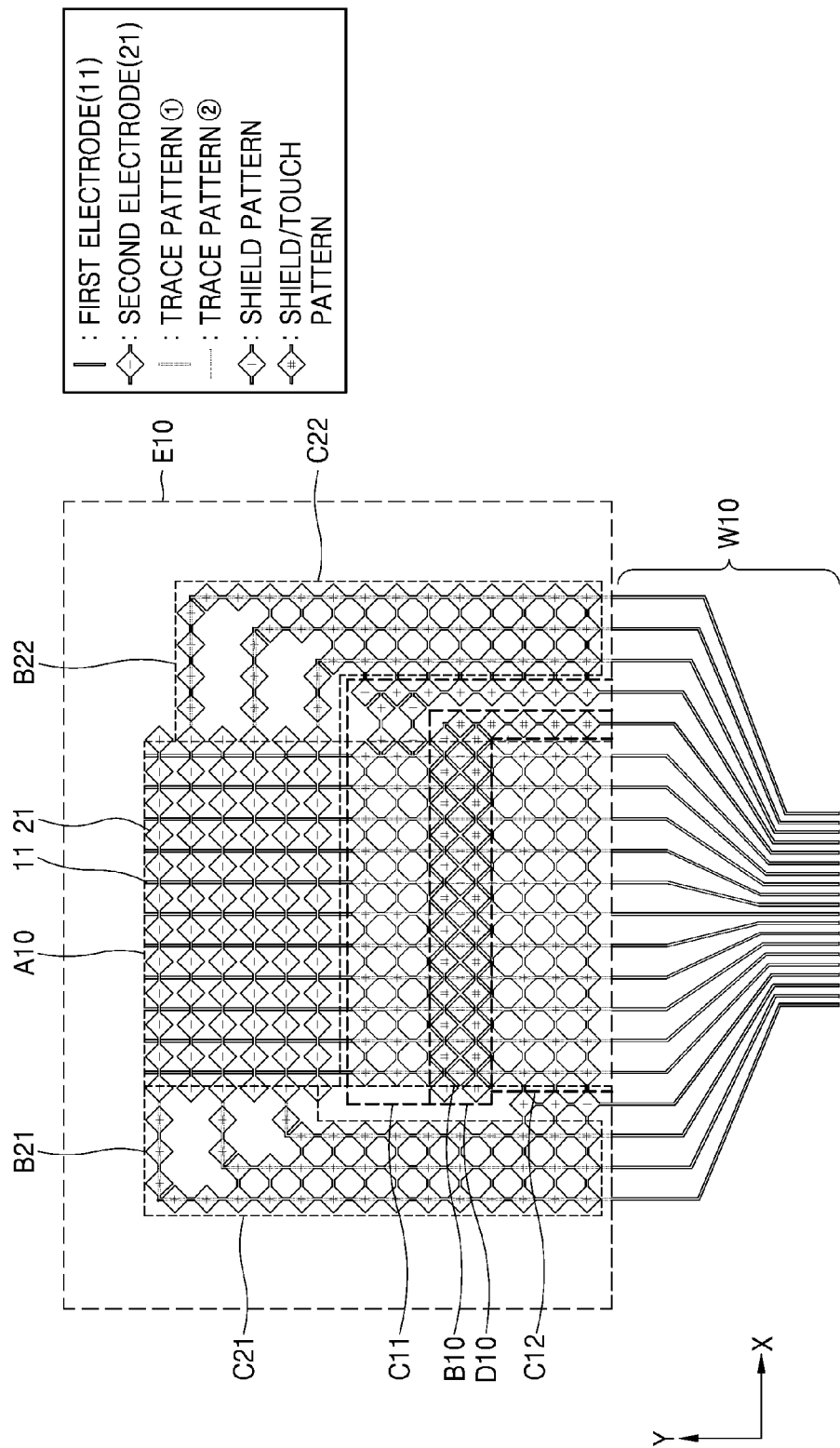
FIG. 6 is a plan view of a detailed configuration of a fingerprint sensor applicable to a touch screen apparatus, according to another exemplary embodiment.

FIG. 6 is a detailed plan view of a fingerprint sensor for use in a touch screen apparatus, according to another exemplary embodiment Referring to FIG. 6, a fingerprint sensing region A10 may include a plurality of first electrodes 11 extending in a first direction, for example, a Y-axis direction, and a plurality of second electrodes 21 extending in a second direction, for example, an X-axis direction. The first electrodes 11 may be line type electrodes, that is, electrode lines. The first electrodes 11 may be formed of a certain metal, an alloy, or a metal compound. Since the first electrodes 11 each may have a width of several micrometers, the first electrodes 11, when being formed of metal, may appear to be almost transparent to the naked eye. In some cases, the first electrodes 11 may be formed of a transparent electrode material. The second electrodes 21, similar to the second electrodes 20 of FIG. 5, may include a plurality of diamond type pattern units and a connector therebetween. The second electrodes 20 may be formed of a transparent conductive oxide, etc.

A first trace region B10 may include a plurality of electrodes lines extending from the first electrodes 11 of the fingerprint sensing region A10. Furthermore, secondary trace regions B21 and B22 may include a plurality of electrodes lines extending from the second electrodes 21 of the fingerprint sensing region A10. The electrode lines of the secondary trace regions B21 and B22 and the second electrodes 21 corresponding thereto may be connected to each other by a conductive plug in a via hole of an insulating layer.

A first shield region C11, a second shield region C12, and a multiple-use region D10 may be provided on the first trace region B10. The patterns of the electrodes of the first shield region C11, the second shield region C12, and the multiple-use region D10 may be similar to the pattern of the second electrodes 21, and the position and arrangement thereof may be the same as illustrated.

A third shield region C21 may be provided on the first secondary trace region B21, and a fourth shield region C22 may be provided on the second secondary trace region B22. The third shield region C21 and the fourth shield region C22 may include electrode patterns having the shape that is the same as or similar to the second electrodes 21. The electrode patterns may be arranged on the electrode lines of the second trace regions B21 and B22.

The electrode patterns of the third shield region C21 may be electrically and physically connected to the electrode patterns of the second shield region C12. Furthermore, the electrode patterns of the fourth shield region C22 may be electrically and physically connected to the electrode patterns of the first shield region C11.

Figure 7:
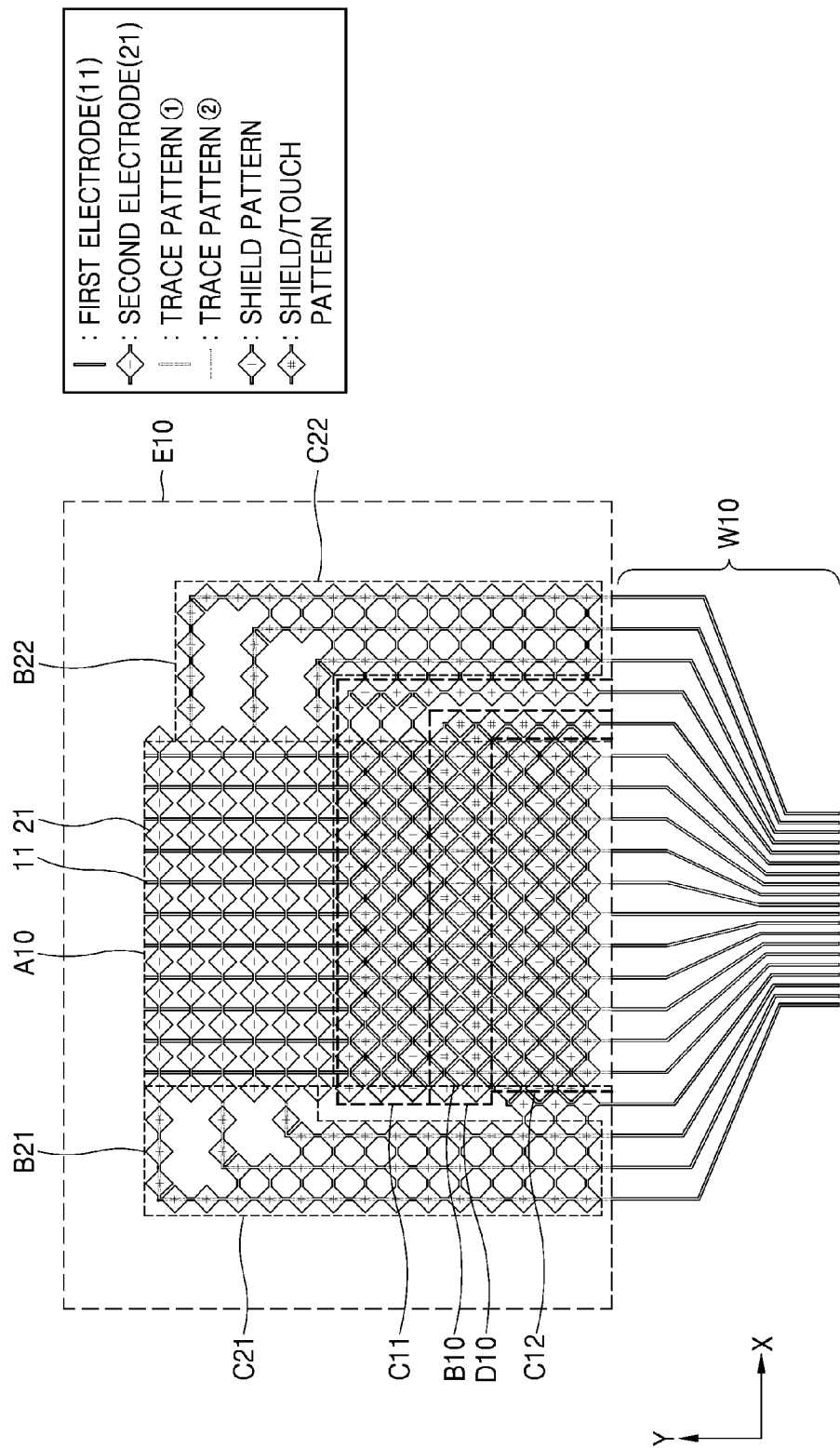
FIG. 7 is a plan view of a detailed configuration of a fingerprint sensor applicable to a touch screen apparatus, according to another exemplary embodiment.

In FIG. 6, patterns of the shield regions C11 and C12 and the multiple-use region D10 on the first trace region B10 may be changed in any of various ways. FIG. 7 illustrates a modified example of the patterns. In FIG. 7, the patterns of the shield regions C11 and C12 and the multiple-use region D10 may be slightly modified from the patterns of FIG. 6. The patterns of the shield regions C11 and C12 and the pattern of the multiple-use region D10 may be separated from each other without being electrically connected to each other.

In FIGS. 5 to 7, the first electrodes 10 and 11 may be, for example, transmission electrodes (Tx electrodes), and the second electrodes 20 and 21 may be, for example, reception electrodes (Rx electrodes). In this case, the first trace region B10 may be a Tx trace region, and the second trace regions B21 and B22 may be Rx trace regions. Although a case in which the second electrodes 20 and 21 are located over the first electrodes 10 and 11 is illustrated and described, the second electrodes 20 and 21 may be located under the first electrodes 10 and 11. Furthermore, the roles and functions of the first electrodes 10 and 11 and the second electrodes 20 and 21 may be switched with each other.

In the touch screen apparatuses according to the exemplary embodiments, at least a portion of the fingerprint sensing region A10 may be used as a region for touch sense in the touch sense mode. In other words, some electrodes of the fingerprint sensing region A10 may be used as the electrode for touch sense. In this case, the touch screen apparatus may be configured to sense a touch by a user by using a touch signal in the fingerprint sensing region A10, a touch signal in the multiple-use region D10, and a touch signal of the touch sensor (200 of FIG. 1) in the touch sense mode. A driving control apparatus and operation apparatus may be configured to sense a touch change in the entire screen by interlinking the touch signal in the fingerprint sensing region A10, the touch signal in the multiple-use region D10, and the touch signal of the touch sensor (200 of FIG. 1).

In the touch screen apparatuses according to the exemplary embodiments, the "shield-touch sensing multiple-use region" may be omitted at one or both sides of the fingerprint sensing region A10 in the X-axis direction. When the second trace regions B21 and B22 are formed at both sides of the fingerprint sensing region A10, the widths of the first secondary trace region B21 and the second secondary trace region B22 are relatively small, and thus the width of each of the first secondary trace region B21 and second secondary trace region B22 may be smaller than the interval of the touch pattern. Accordingly, there may be no problem in touch recognition when the secondary trace regions B21 and B22 do not include the multiple-use region. However, when necessary, the secondary trace regions B21 and B22 may include the multiple-use region.

Figure 8:
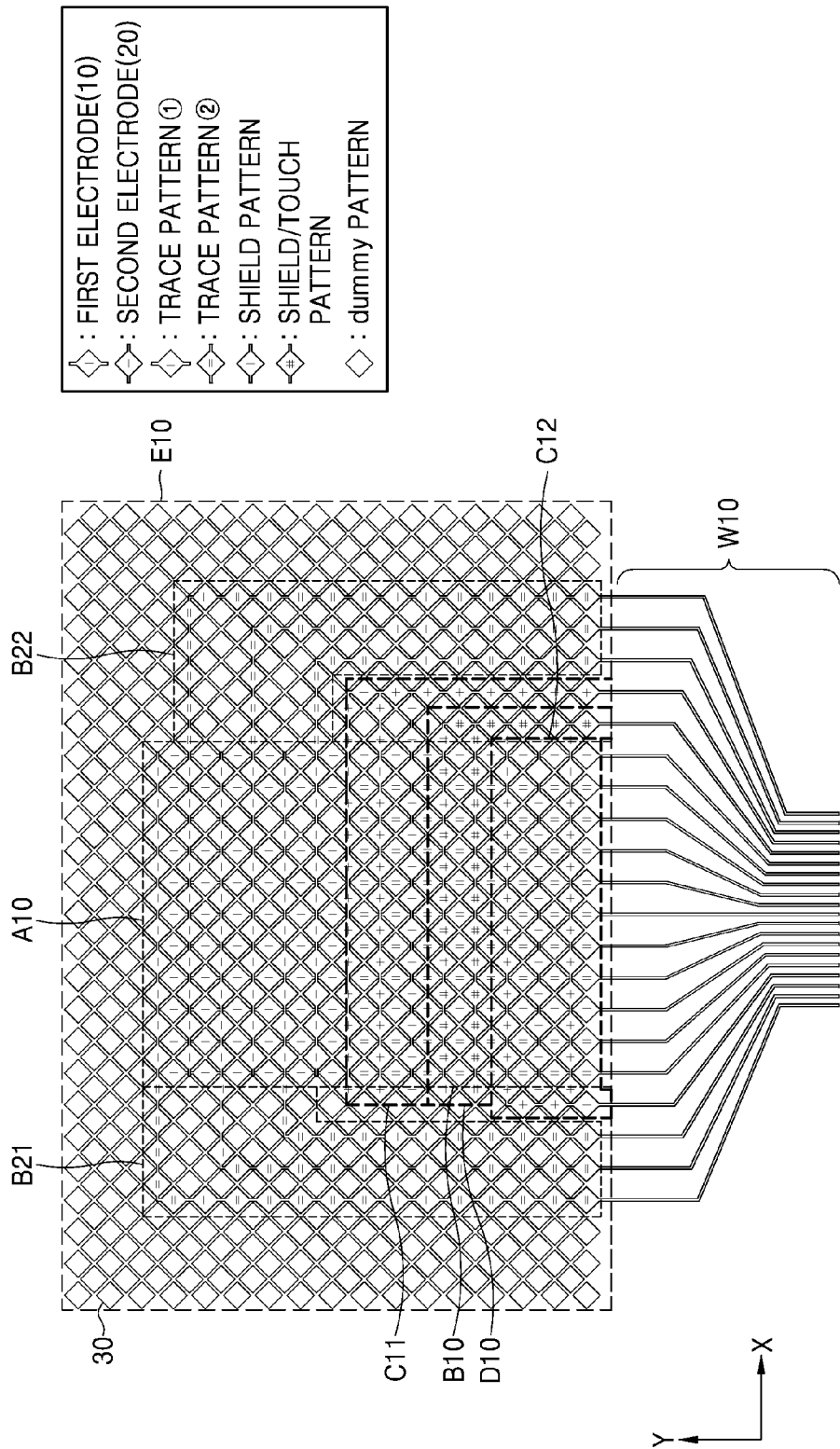
FIG. 8 is a plan view of a detailed configuration of a fingerprint sensor applicable to a touch screen apparatus, according to another exemplary embodiment.
Figure 9:
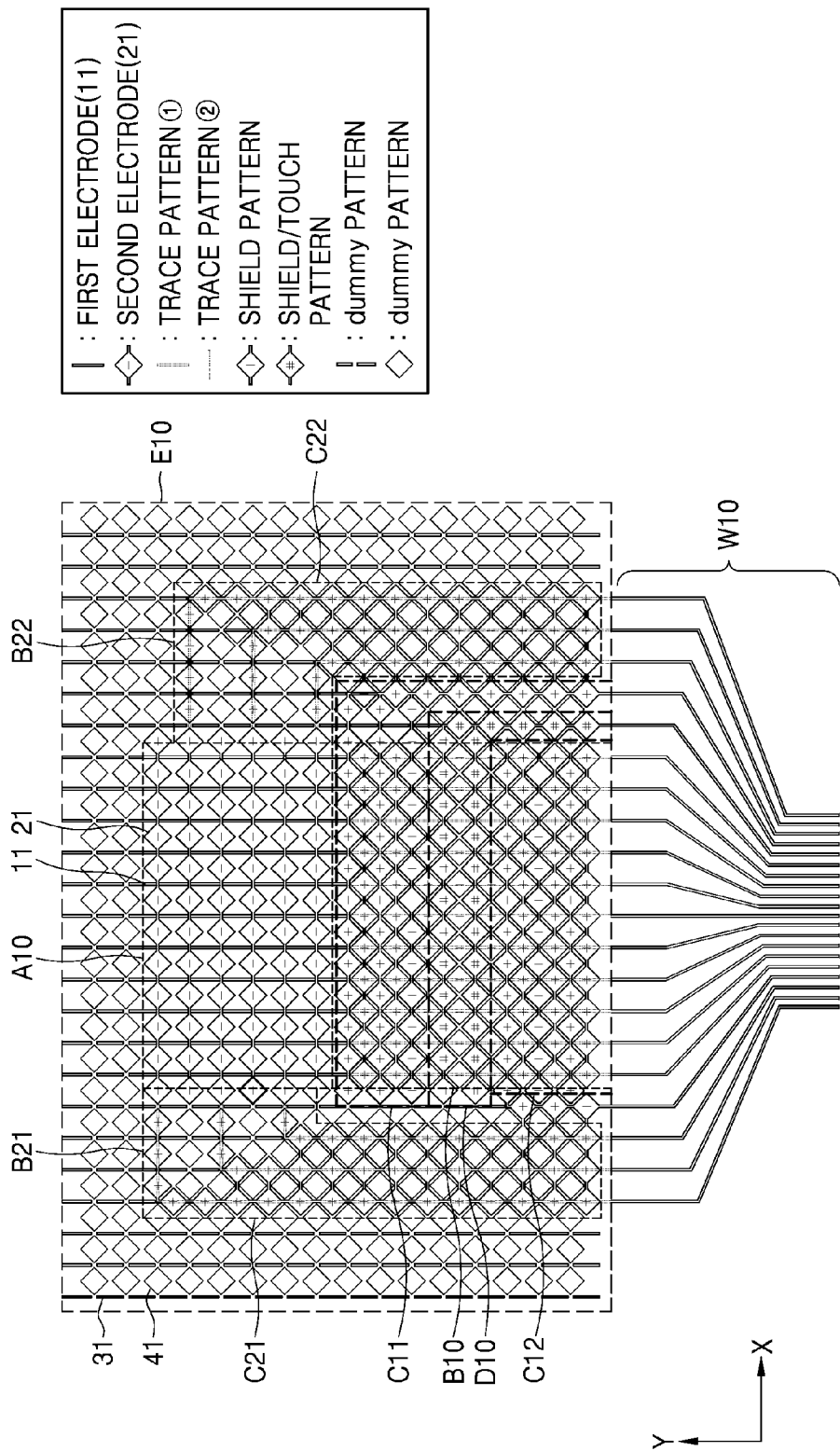
FIG. 9 is a plan view of a detailed configuration of a fingerprint sensor applicable to a touch screen apparatus according to another exemplary embodiment.

The touch screen apparatus according to an exemplary embodiment may further include dummy patterns provided around and outside the fingerprint sensing region and the trace region. FIGS. 8 and 9 illustrate cases in which the dummy pattern are provided. FIG. 8 illustrates that a dummy pattern 30 is provided in the embodiment of FIG. 5, and FIG. 9 illustrates that the dummy patterns 31 and 41 are provided in the embodiment of FIG. 7.

Referring to FIG. 8, the dummy pattern 30 may be provided around and outside the fingerprint sensing region A10 and the trace regions B10, B21, and B22. The dummy pattern 30 may be an individually independent diamond type or a polygonal pattern unit. The dummy pattern 30 may be formed of a transparent conductive oxide, etc. As the dummy pattern 30 is formed around the fingerprint sensing region A10 and the trace regions B10, B21, and B22 and has a shape similar thereto, a change of visibility may be reduced. In other words, a phenomenon that the electrode pattern appears to be dominant in a particular region may be reduced. A part of the dummy pattern 30 may be provided at the same level (height) as the first electrodes 10, and other part of the dummy pattern 30 may be provided at the same level (height) as the second electrodes 20.

Referring to FIG. 9, the dummy patterns 31 and 41 may be provided around and outside the fingerprint sensing region A10 and the trace regions B10, B21, and B22. In FIGS. 8 and 9, the shapes and locations of the dummy patterns 30, 31, and 41 are merely exemplary, and may be changed in any of various ways.

FIG. 10 is a plan view of a configuration of a fingerprint sensor according to a comparative example.

Referring to FIG. 10, a fingerprint sensor according to a comparative example may include a fingerprint sensing region A1, a first trace region B1, a first secondary trace region B2, and a second secondary trace region B3. The fingerprint sensor according to the comparative example does not include a shield region and a shield-touch sensing multiple-use region. In the fingerprint sensor, for fingerprint recognition, when a finger touches a trace region, for example, the first trace region B1, noise is generated in the capacitance change, and thus it may be difficult to obtain a fingerprint image having a high SNR. When a separate shield layer is further formed on the trace regions B1, B2, and B3, a separate insulating layer may be further provided on the fingerprint sensing region A1, and thus the number of process stages increases and costs increase. Since a sensing distance increases due to the separate insulating layer, the SNR of a fingerprint image may deteriorate.

Figure 11A:
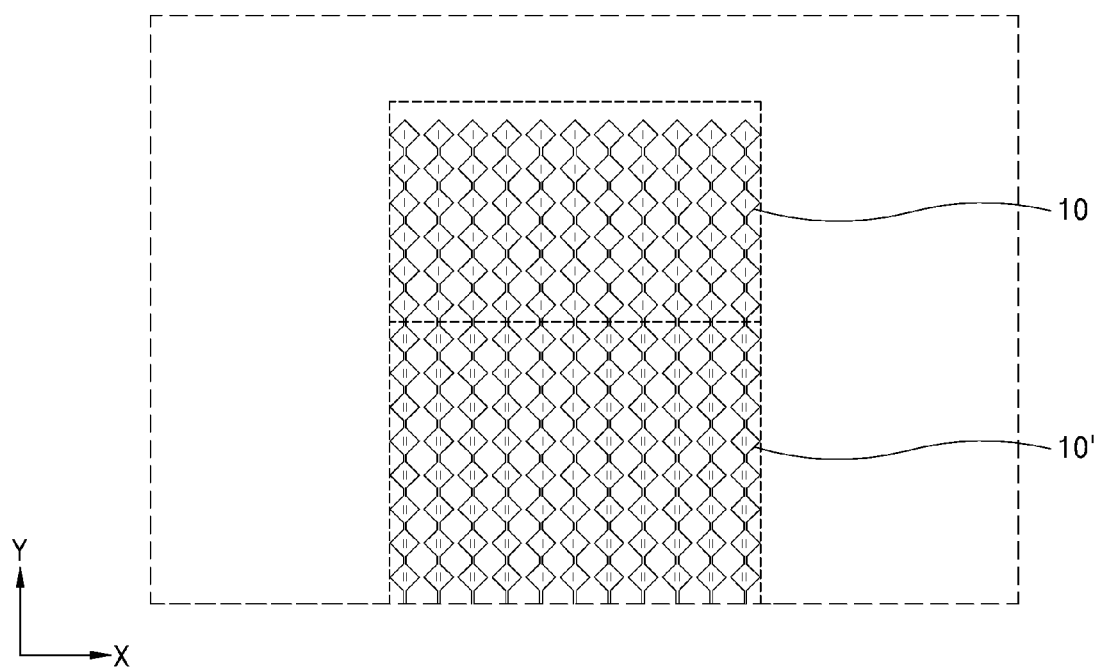
FIG. 11A is a plan view of a configuration of a first layer of a fingerprint sensor applicable to a touch screen apparatus, according to an exemplary embodiment.

FIG. 11A is a plan view of a configuration of a first layer of a fingerprint sensor for use in a touch screen apparatus, according to an exemplary embodiment. The present exemplary embodiment may be a configuration of the first layer of the embodiment of FIG. 5.

Referring to FIG. 11A, the first electrodes 10 may extend in the Y-axis direction and an electrode pattern, that is, an extension portion, 10' may extend from each of the first electrodes 10. The extension portion 10' of the first electrodes 10 may correspond to the first trace region B10.

Figure 11B:
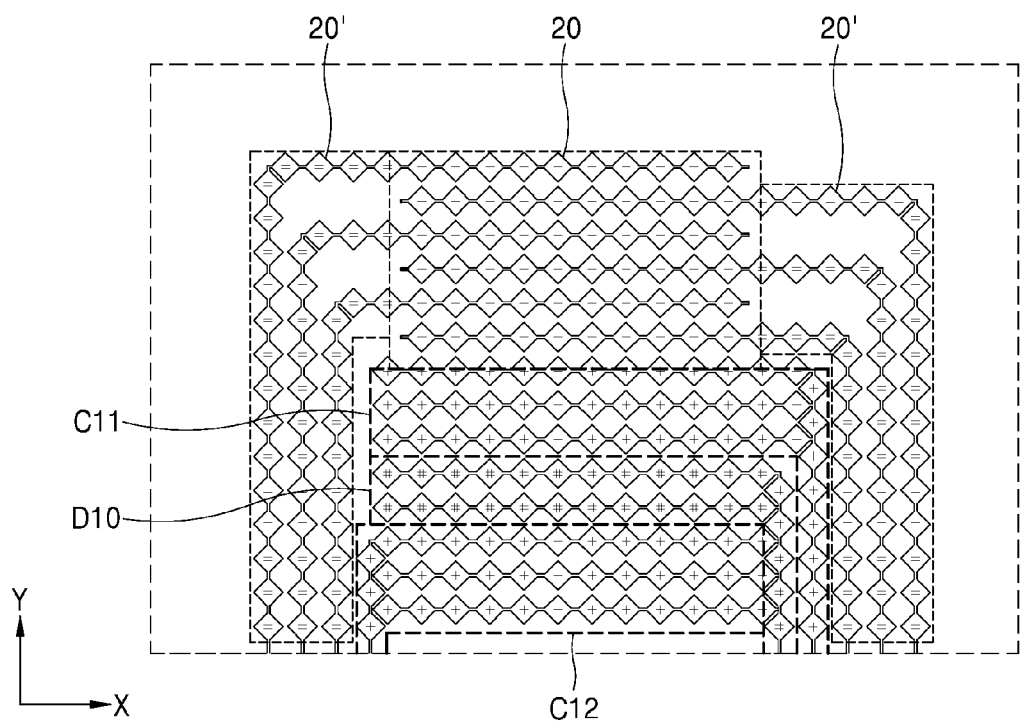
FIG. 11B is a plan view of a configuration of a second layer of a fingerprint sensor applicable to a touch screen apparatus, according to an exemplary embodiment.

FIG. 11B is a plan view of a configuration of a second layer of a fingerprint sensor for use in a touch screen apparatus, according to an exemplary embodiment. The present exemplary embodiment may be a configuration of the second layer of FIG. 5.

Referring to FIG. 11B, the second electrodes 20 extend in the X-axis direction and an electrode pattern, that is, an extension portion, 20' may extend from each of the second electrodes 20. The extension portion 20' of the second electrodes 20 may correspond to the secondary-first and second secondary trace regions B21 and B22. Furthermore, electrode patterns corresponding to the shield regions C11 and C12 and the multiple-use region D10 may be provided under the second electrodes 20.

An insulating layer may be provided on the first layer configuration of FIG. 11A, and the second layer configuration of FIG. 11B is provided on the insulating layer, thus forming the fingerprint sensor of FIG. 5.

Figure 12A:
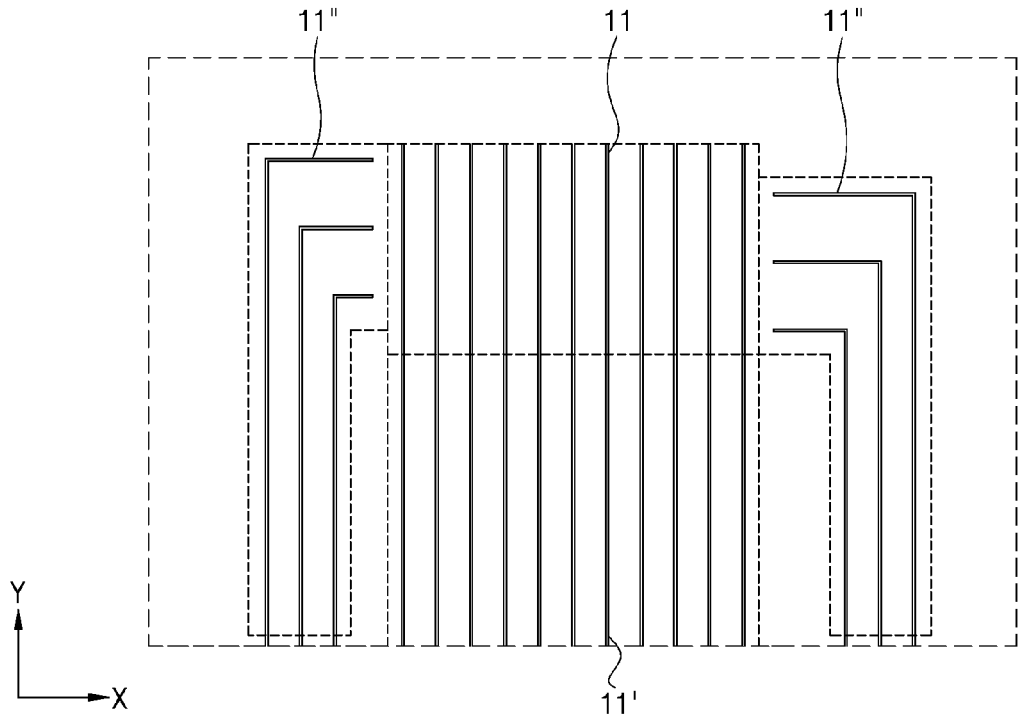
FIG. 12A is a plan view of a configuration of a first layer of a fingerprint sensor applicable to a touch screen apparatus, according to another exemplary embodiment.

FIG. 12A is a plan view of a configuration of a first layer of a fingerprint sensor for use in a touch screen apparatus, according to another exemplary embodiment. The present exemplary embodiment may be a configuration of the first layer of the embodiment of FIG. 6.

Referring to FIG. 12A, the first electrodes 11 extend in the Y-axis direction and an electrode pattern, that is, an extension portion, 11' may extend from each of the first electrodes 11. The extension portion 11' of the first electrodes 11 may correspond to the first trace region B10. Furthermore, separate electrode lines 11" may be provided at both sides of the first electrodes 11. The electrode lines 11" may correspond to the secondary-first and second secondary trace regions B21 and B22.

Figure 12B:
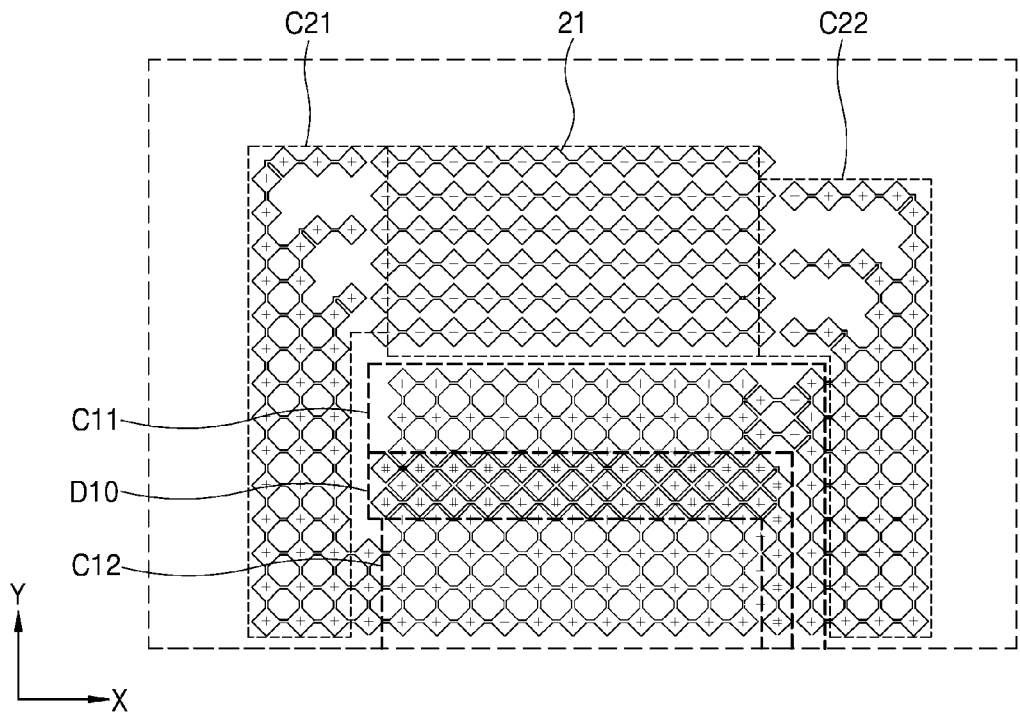
FIG. 12B is a plan view of a configuration of a second layer of a fingerprint sensor applicable to a touch screen apparatus, according to another exemplary embodiment.

FIG. 12B is a plan view of a configuration of a second layer of a fingerprint sensor for use in a touch screen apparatus, according to another exemplary embodiment. The present exemplary embodiment may be a configuration of the second layer of the embodiment of FIG. 6.

Referring to FIG. 12B, the second electrodes 21 may extend in the X-axis direction. The first and second shield regions C11 and C12 and the multiple-use region D10 may be provided under the second electrodes 21, and the third and fourth shield regions C21 and C22 may be provided at both sides of the second electrodes 21.

An insulating layer may be provided on the first layer configuration of FIG. 12A, and the second layer configuration of FIG. 12B may be provided on the insulating layer, thus forming the fingerprint sensor of FIG. 6.

Figure 13:
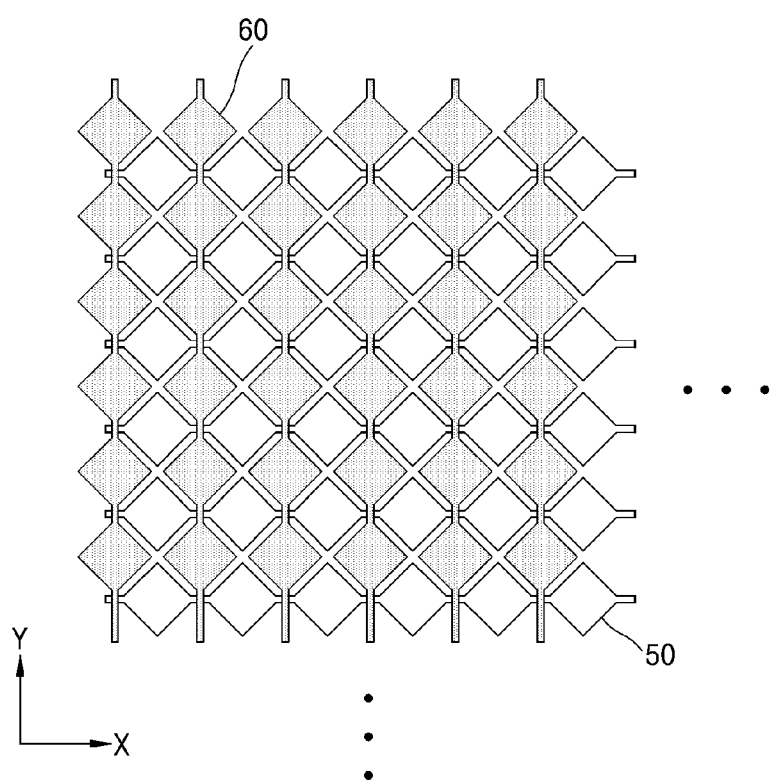
FIG. 13 is a plan view of a configuration of a touch sensor applicable to a touch screen apparatus, according to an exemplary embodiment.

FIG. 13 is a plan view of a configuration of a touch sensor for use in a touch screen apparatus, according to an exemplary embodiment.

Referring to FIG. 13, the touch sensor may include a plurality of electrodes (hereinafter, the third electrode) 50 extending in a first direction, for example, the X-axis direction, and a plurality of other electrodes (hereinafter, the fourth electrodes) 60 extending in a second direction, for example, the Y-axis direction. An insulating layer may be provided between the third electrodes 50 and the fourth electrodes 60. Capacitance may be formed between the third electrodes 50 and the fourth electrodes 60. Although a case in which both the third electrodes 50 and the fourth electrodes 60 have diamond type pattern units and a connector therebetween is illustrated and described, this is merely exemplary and the shapes of the third and fourth electrodes 50 and 60 may be changed in any of various ways. The third and fourth electrodes 50 and 60 may have polygonal pattern units, not diamond pattern units, and at least one of the third and fourth electrodes 50 and 60 may be line patterns.

Figure 14:
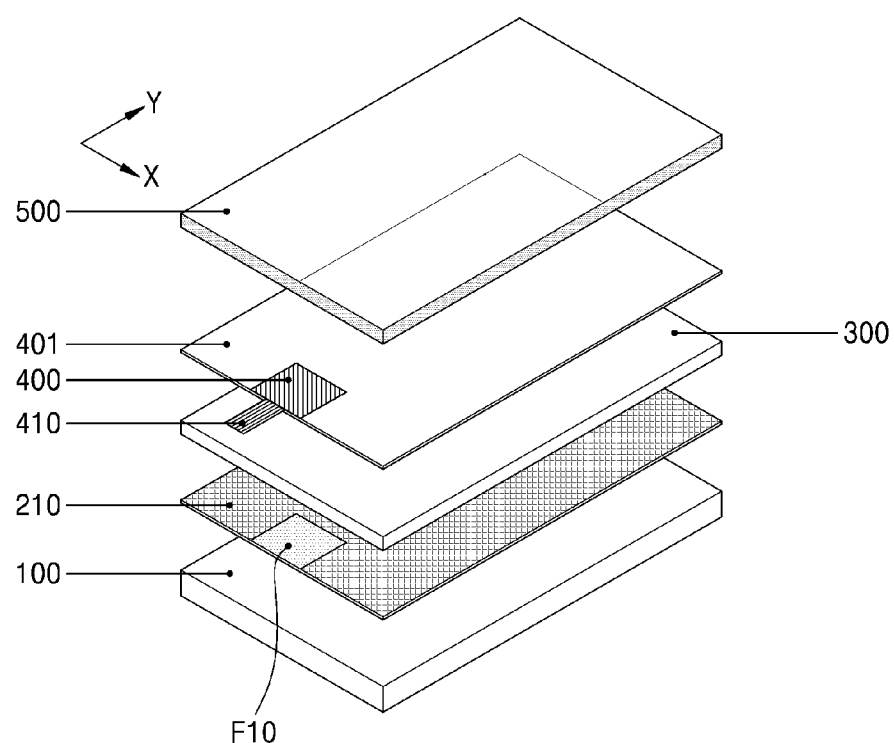
FIG. 14 is an exploded perspective view of a fingerprint recognizable touch screen apparatus according to another exemplary embodiment.

FIG. 14 is an exploded perspective view of a fingerprint recognizable touch screen apparatus according to another exemplary embodiment.

Referring to FIG. 14, a touch sensor 210 and the fingerprint sensor 400 may be arranged to face each other with respect to the transparent separation film 300 interposed therebetween. A partial region of the touch sensor 210 corresponding to the fingerprint sensing region and the trace region of the fingerprint sensor 400 may be an inactive region F10. The inactive region F10 is a region where a touch sense electrode (channel) is not activated, and thus the inactive region F10 may not affect the signal sensing of the fingerprint sensor 400.

Figure 15:
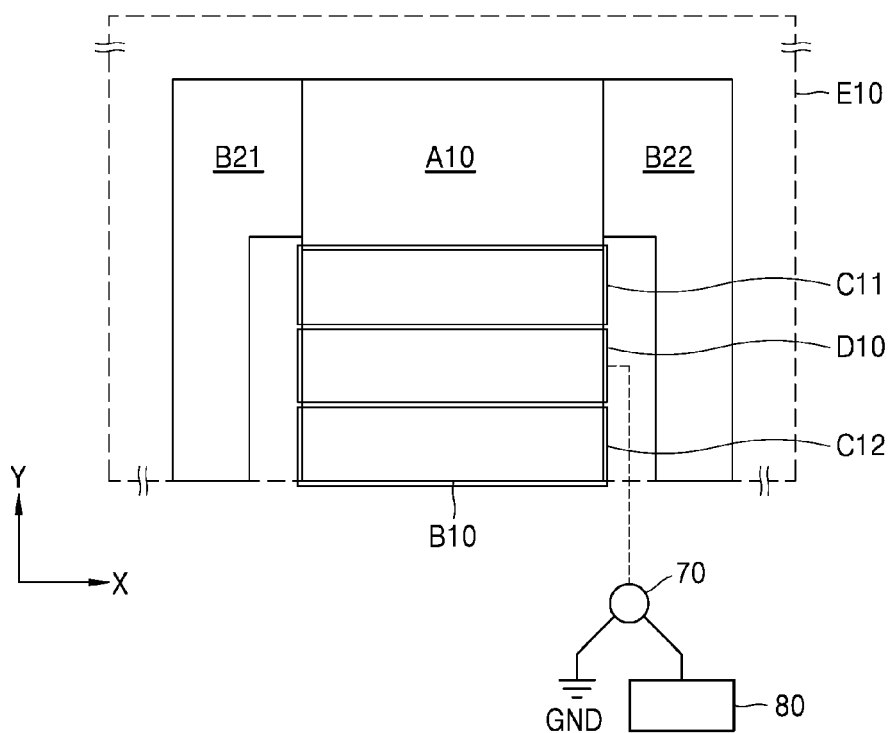
FIG. 15 is a plan view of a fingerprint recognizable touch screen apparatus according to an exemplary embodiment.

FIG. 15 is a plan view of a fingerprint recognizable touch screen apparatus according to an exemplary embodiment.

Referring to FIG. 15, the shield-touch sensing multiple-use region D10 may be configured to be grounded or receive a constant voltage applied thereto, in the fingerprint recognition mode, and to connect to a touch sensing circuit portion 80 in the touch sense mode. To this end, the multiple-use region D10 may be connected to a switch device 70, and the switch device 70 may be connected to a ground terminal GND and the touch sensing circuit portion 80. The multiple-use region D10 may include an Rx electrode for touch. In this case, the touch sensing circuit portion 80 may be an Rx circuit terminal.

The any of various touch screen apparatuses according to the above-described embodiments may be applied to all electronic devices including a touch display according to the related art. For example, the touch screen apparatus may be applied not only to mobile devices such as smart phones, tablet PCs, etc., but also to any of various electronic devices such as automatic teller machines (ATM), automatic ticketing machines, navigation systems, etc. Also, the touch screen apparatus may be applied, in any of various methods, to mobile devices, access control devices, financial devices, etc. requiring a personal authorization function through fingerprint recognition.

It should be understood that exemplary embodiments described herein should be considered in a descriptive sense only and not for purposes of limitation. For example, a person having an ordinary skill in the art to which the present inventive concept pertains could have seen that the method of operating the fingerprint sensor, the touch screen apparatus, and the touch screen apparatus, which are described with reference to FIGS. 1 to 15, and the electronic device including the touch screen apparatus may be modified in any of various ways. Therefore, the scope of the inventive concept is defined not by the detailed description of the inventive concept but by the appended claims, and all differences within the scope will be construed as being included in the present inventive concept.

What is claimed is:

1. A fingerprint recognizable touch screen apparatus comprising:
   a touch sensor configured to sense a touch of a user; and
   a fingerprint sensor configured to identify a fingerprint of the user,
   wherein the fingerprint sensor comprises:
      a fingerprint sensing region; and
      at least one trace region extending from the fingerprint sensing region;
      wherein the at least one trace region comprises at least one shield region and at least one shield-touch sensing multiple-use region,
      wherein the fingerprint recognizable touch screen apparatus configured to be switchable between a fingerprint recognition mode and a touch sense mode, wherein the fingerprint recognizable touch screen apparatus further comprises:
         a switch electrically connected to an electrode of the shield-touch sensing multiple-use region and to a touch sensing circuit, such that the electrode of the shield-touch sensing multiple-use region is configured to be grounded or receive a constant voltage in the fingerprint recognition mode and to be connected to the touch sensing circuit in the touch sense mode.

2. The fingerprint recognizable touch screen apparatus of claim 1, wherein the at least one shield region is electrically connected to at least one of a ground and a constant voltage source.

3. The fingerprint recognizable touch screen apparatus of claim 1, wherein the at least one shield-touch sensing multiple-use region comprises a first multiple-use region spaced apart from the fingerprint sensing region, and
   the at least one shield region comprises a first shield region arranged between the fingerprint sensing region and the first multiple-use region.

4. The fingerprint recognizable touch screen apparatus of claim 3, wherein the at least one shield region further comprises a second shield region spaced apart from the first shield region, and
   the first multiple-use region is arranged between the first shield region and the second shield region.

5. The fingerprint recognizable touch screen apparatus of claim 1, wherein the fingerprint sensing region is spaced apart from an end portion of the touch screen apparatus, and
   the at least one shield region and the at least one shield-touch sensing multiple-use region are alternately arranged between the fingerprint sensing region and the end portion of the touch screen apparatus.

6. The fingerprint recognizable touch screen apparatus of claim 1, wherein the fingerprint sensing region comprises:
   a plurality of first electrodes extending in a first direction;
   a plurality of second electrodes extending in a second direction, different from the first direction; and
   an insulating layer provided between the plurality of first electrodes and the plurality of second electrodes, and
   the at least one trace region comprises a first trace region extending from the plurality of first electrodes and a second trace region extending from the plurality of second electrodes.

7. The fingerprint recognizable touch screen apparatus of claim 6, wherein the at least one shield region and the at least one shield-touch sensing multiple-use region are provided in the first trace region.

8. The fingerprint recognizable touch screen apparatus of claim 6, wherein the at least one shield region is provided in each of the first trace region and the second trace region, and
   the at least one shield-touch sensing multiple-use region is provided in the first trace region.

9. The fingerprint recognizable touch screen apparatus of claim 8, wherein the at least one shield region comprises a first shield region which shields a first trace provided in the first trace region and a second shield region which shields a second trace provided in the second trace region, and
   the first shield region which shields the first trace is electrically connected to the second shield region which shields the second trace.

10. The fingerprint recognizable touch screen apparatus of claim 6, wherein the second trace region comprises a first secondary trace region extending to a first side of the fingerprint sensing region and a second secondary trace region extending to a second side of the fingerprint sensing region.

11. The fingerprint recognizable touch screen apparatus of claim 1, wherein the fingerprint sensing region comprises a plurality of first electrodes extending in a first direction and a plurality of second electrodes extending in a second direction, different from the first direction, and
at least one of the plurality of first electrodes and the plurality of second electrodes comprises a plurality of diamond type pattern units and a connector connecting the plurality of diamond type pattern units.

12. The fingerprint recognizable touch screen apparatus of claim 11, wherein the plurality of first electrodes comprises a first plurality of diamond type pattern units and a first connector connecting the first plurality of diamond type pattern units, and
the plurality of second electrodes comprises a second plurality of diamond type pattern units and a second connector connecting the second plurality of diamond type pattern units.

13. The fingerprint recognizable touch screen apparatus of claim 11, wherein the plurality of first electrodes comprises a plurality of electrodes lines, and the plurality of second electrodes comprises the plurality of diamond type pattern units and the connector connecting the plurality of diamond type pattern units.

14. The fingerprint recognizable touch screen apparatus of claim 1, wherein the at least one trace region comprises one of:
a plurality of diamond type pattern units and a connector connecting the plurality of diamond type pattern units, and
a plurality of line pattern units.

15. The fingerprint recognizable touch screen apparatus of claim 1, wherein at least one of the shield region and the shield-touch sensing multiple-use region comprises a plurality of diamond type pattern units and a connector connecting the plurality of diamond type pattern units.

16. The fingerprint recognizable touch screen apparatus of claim 15, configured to sense the touch of the user based on a first touch signal received from the fingerprint sensing region, a second touch signal received from the at least one shield-touch sensing multiple-use region, and a third touch signal received from the touch sensor in the touch sense mode.

17. The fingerprint recognizable touch screen apparatus of claim 1, further comprising a dummy pattern provided around and outside the fingerprint sensing region and the at least one trace region.

18. The fingerprint recognizable touch screen apparatus of claim 1, wherein the fingerprint sensing region comprises a plurality of electrodes configured to operate as touch sense electrodes in the touch sense mode.

19. The fingerprint recognizable touch screen apparatus of claim 1, wherein the touch sensor and the fingerprint sensor face each other with a separation film interposed therebetween, and
a partial region of the touch sensor corresponding to the fingerprint sensing region and the at least one trace region is an inactive region.

20. The fingerprint recognizable touch screen apparatus of claim 1, wherein the touch sensor comprises:
a plurality of third electrodes extending in a first direction;
a plurality of fourth electrodes extending in a second direction, different from the first direction; and
an insulating layer provided between the plurality of third electrodes and the plurality of fourth electrodes.

21. An electronic apparatus comprising the fingerprint recognizable touch screen apparatus defined in claim 1.

* * * * *